United States Patent [19]

Prince et al.

[11] 4,351,168
[45] Sep. 28, 1982

[54] TORSION VIBRATION DAMPER

[75] Inventors: George T. Prince, West Allis; Gerardus M. Ballendux, Waukesha, both of Wis.

[73] Assignee: Allis-Chalmers Corporation, Milwaukee, Wis.

[21] Appl. No.: 220,520

[22] Filed: Dec. 29, 1980

[51] Int. Cl.³ .............................................. F16D 3/14
[52] U.S. Cl. .................................. 464/64; 192/106.1; 192/106.2; 464/68
[58] Field of Search ........................... 64/27 C, 27 F; 192/106.1, 106.2

[56] References Cited

U.S. PATENT DOCUMENTS

| | | | |
|---|---|---|---|
| 1,321,512 | 11/1919 | Eaton | 64/27 C |
| 4,188,805 | 2/1980 | Fall | 64/27 C |
| 4,188,806 | 2/1980 | Fall | 64/27 C |
| 4,279,132 | 7/1981 | Lamarche | 64/27 C |
| 4,318,283 | 3/1982 | Windish | 64/27 C |

*Primary Examiner*—Edward J. McCarthy
*Attorney, Agent, or Firm*—Arthur L. Nelson

[57] ABSTRACT

A torsional vibration damper having limit stops to limit the compression of the springs and to avoid overstraining of the springs. Spring retainers which seat on the driving and driven members have protrusions and recesses to minimize relative rubbing motion and wear and provide improved alignment of the spring seats in the assembly with the springs and the driving and driven members.

10 Claims, 12 Drawing Figures

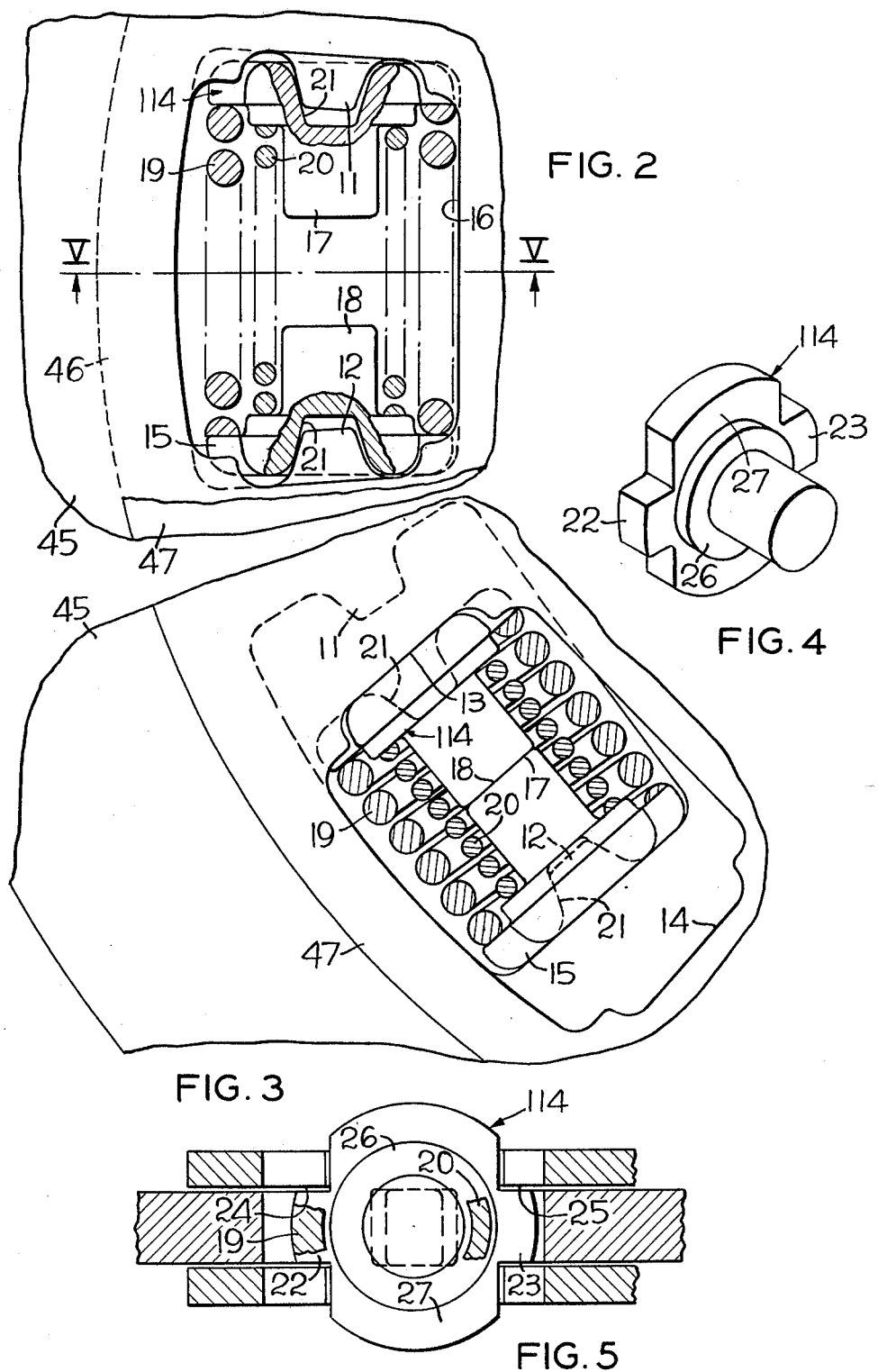

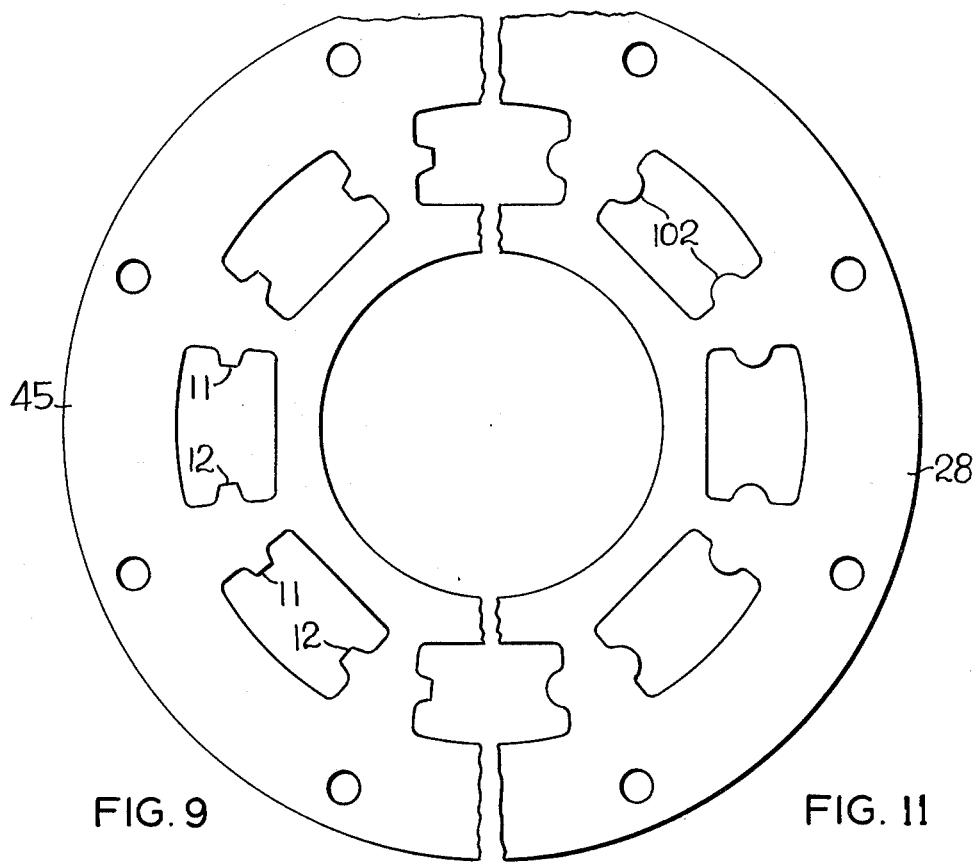
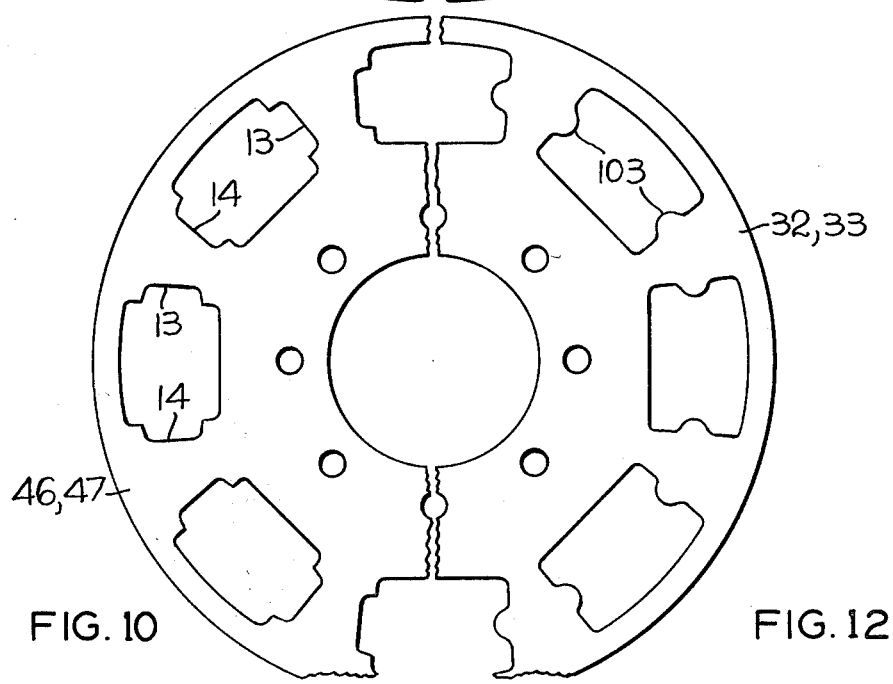
FIG. 9  FIG. 11
FIG. 10  FIG. 12

TORSION VIBRATION DAMPER

This invention relates to a torsional vibration damper, and, more particularly, to a torsional coupling with compression springs angularly spaced in spring slots for driving the driven members for transmitting torque and reducing vibrations. The spring seats provide limit stops to avoid overstraining of the springs and centering means. Recesses on the ends of the spring seats where they engage the driving and driven members reduce wear (by resisting centrifugal force), chatter and vibrations and assure alignment in the assembly.

In the transmission of power in a vehicle from the engine to the final drive asembly, some provision for reducing torsional vibrations should be provided. If a fluid coupling is not used and a direct drive is employed, a torsional coupling with a provision for damping torsional vibrations is needed. The torsional coupling includes a driving member axially aligned with the driven member for transmission through vibration damping means in the coupling to eliminate or substantially reduce torsional vibrations transmitted through the torsional coupling. An example of this type of assembly is shown in the Fall et al. patents, U.S. Pat. Nos. 4,188,805 and 4,188,806 providing torsional vibration damper. These patents illustrate compression springs on a common radius and angularly spaced in the torsional coupling. The springs bear against flanges in the driving and driven member to transmit torque through the springs and reduce torsional vibrations. The patents, however, do not disclose the use of spring seats which are interchangeable and which have abutments forming limit stops as well as recesses in the ends to provide alignment with protrusions in the driving and driven members to reduce relative rubbing motion and wear during the operation. Accordingly, it is believed these features distinguish the applicants' invention over the references cited.

It is an object of this invention to provide a torsional vibration damper in a torsional coupling.

It is another object of this invention to provide a torsional coupling having torsional vibration damping between the driving and driven members.

It is a further object of this invention to provide a torsional vibration damper having spring slots formed in the driving and driven members angularly spaced in the coupling to support springs. Spring seats support the springs and form abutments which engage each other to limit the compressive force transmitting through the springs per se.

It is a further object of this invention to provide a torsional vibration damper defining spring slots for receiving springs mounted on spring seats defining recessed portions to provide alignment of the spring seats in the slots and alignment of the spring seats relative to the driving and the driven members.

The objects of this invention are provided in a torsional coupling including a vibration damper. The coupling is formed of a driving and a driven disk defining spring slots which receive springs angularly spaced about the rotational axle of the coupling. The spring slots are on a common radius about the rotating center. Two springs are mounted within each spring slot and are aligned on spring seats which seat on the driving and driven members. The spring seat has engaging recessed slots engaging the driving and driven members to maintain alignment in their operating position. Abutments extend axially in the center of the springs to engage each when a predetermined torque is transmitted through the coupling to prevent excessive strain on the spring during operation. Accordingly, the coupling with the vibration damper transmits torque and dampens vibrations and assures that the springs will not be overstressed due to the abutments of the spring seats.

Referring to the drawings, the preferred embodiments of this invention are illustrated.

FIG. 2 is a cross-section view of one of the torque transmitting spring assemblies with the spring seats in the static position.

FIG. 3 is a cross-section view of one of the spring assemblies with the spring assembly transmitting torque.

FIG. 4 is a three dimensional view of one of the spring seats.

FIG. 5 is a cross-section view taken on line V—V of FIG. 2.

FIG. 9 is a side elevation view of the torque transmitting drive member.

FIG. 10 is a side elevation view of the torque transmitting driven member.

FIG. 11 is a side elevation view of the torque transmitting drive member shown in FIG. 6.

FIG. 12 is a side elevation view of the torque transmitting driven member.

Figure 1:
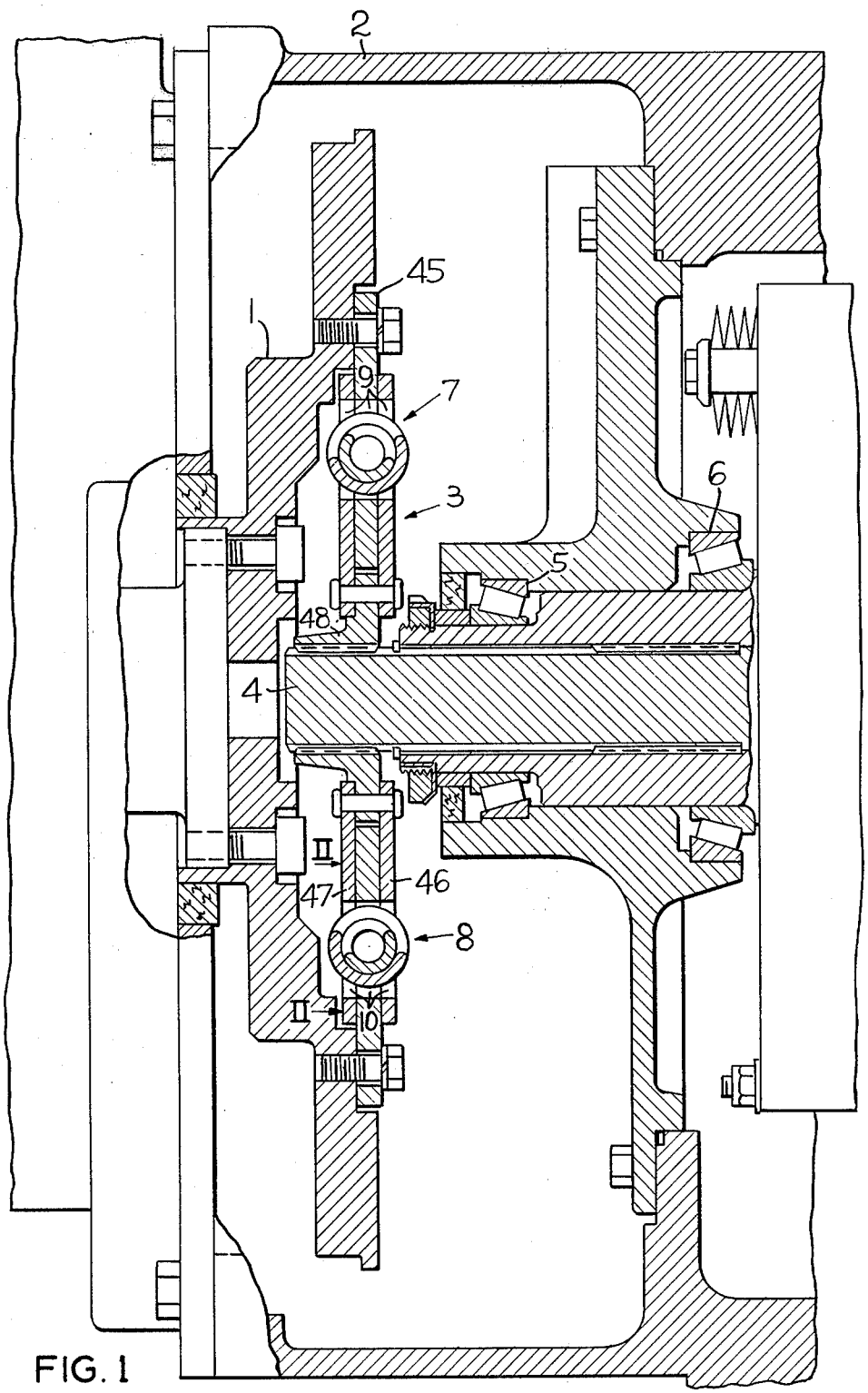
FIG. 1 is a cross-section view of the torsional coupling with the torsional damper.

Referring to the drawings, drive member 1 is rotatably mounted in transmission housing 2 on a bearing assembly (not shown). Driven member 3 is carried on the driven shaft 4 which is rotatably mounted on bearing assemblies 5 and 6. Torque transmitting spring assemblies 7 and 8 are shown in spring slots 9 and 10 as shown. A plurality of spring slots are shown in FIGS. 9, 10, 11 and 12. The drive member 45 shows a spring slot formed with the protrusion 11 from one side of the spring slot and the protrusion 12 on the opposite side of the spring slot. These protrusions extend into the spring seat as will be subsequently described. The driven member is formed with facings 13 and 14 which engage the end of the spring seat in the driving position.

Referring to FIGS. 2 and 3, the spring seats 114 and 15 are shown assembled in the spring slot 16. The protrusions 17 and 18 extend axially within the springs 19 and 20. Each spring seat is formed with the recess 21 centrally aligned with the protrusions 11 and 12 of the driving member.

FIG. 3 illustrates driving torque being transmitted from the abutment 12 of the driving member to the spring seat 15. Torque transmitted is such that the abutments 17 and 18 are engaging and the maximum torque is transmitted through the springs and any excess torque is transmitted through the abutments 17 and 18. Spring seat 114 is engaging the facing 13 to transmit the force to the driven member.

Figure 6:
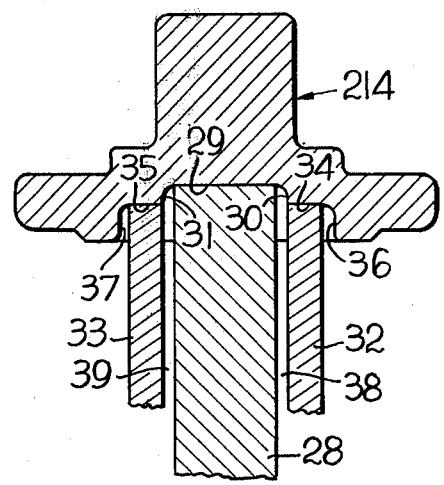
FIG. 6 is a cross-section view through a modification of one spring seat positioned on the driving and driven torque transmitting members.
Figure 7:
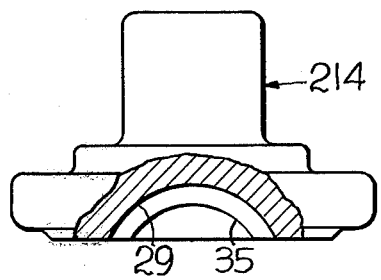
FIG. 7 is a partial cross-section view of the spring seat of FIG. 6 taken at right angles of FIG. 6.
Figure 8:
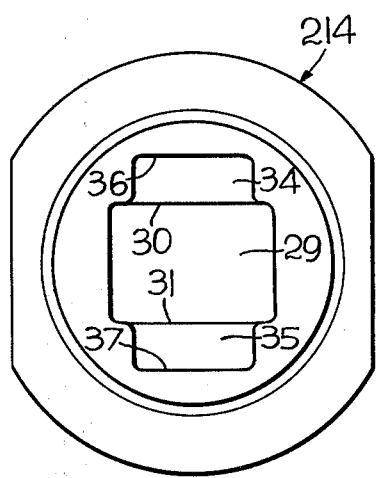
FIG. 8 is an end view of the spring seat of FIG. 7.

Spring seat 114 is shown in three dimension in FIG. 4. The tabs 22 and 23 fit in the slots 24 and 25 as illustrated in FIG. 5. This prevents rotation of the spring seat 114 in its assembled position. The springs engage the end of the spring seat 114 with the spring 20 engaging the radial facing 26 and the spring 19 engaging the radial facing 27. Spring 20 is a shorter spring and a smaller spring than the spring 19. The cross-section view of a modified spring seat 214 is shown in FIG. 6. The driving member 28 is shown engaging a spring seat in the recess 29. It is noted that recess 29 has radial edges 30 and 31 which tend to center the driving member 28 in the recess 29. Similarly, the driven elements 32, 33 engage the recesses 34, 35. These recesses also form radial edges 36 and 37 which tend to center the driven elements in a center of these recesses. The centering of the driving and driven members tends to prevent wear between the interface 38 and 39 in the operating position.

The operation of the device will be described in the following paragraphs.

Normally, the driving member 1 which includes the plate 45 drives through the spring assembly 7 and 8 to the driven member which includes the disks 46 and 47 which are connected to the hub 48 which drives the shaft 4. The torque is transmitted through a plurality of spring assemblies which is indicated by FIGS. 9 and 10 showing the driving and driven members. The springs 19 and 20 are mounted on spring seats 114 and 15 which are interchangeable. The spring seats are adapted for use in the combination of the spring assemblies as shown in FIGS. 2 and 3. The protrusions 11 and 12 are seated in the recesses 21 (as shown) in FIG. 2. In the modification, recess 29 of spring seat 214 receives protrusion 102 on a driving member and secondary recesses 34 and 35 receive protrusions 103 on a driven member, which assists in the alignment of the driven elements 32 and 33 with the driving plate 28 in operation. FIGS. 11 and 12 illustrate protrusions 102 and 103 on the driving and driven members. In operation, the driving member 28 drives the driven member 32 and 33 through the spring assembly. Under static conditions FIG. 2 shows the assembly, and when power is transmitted, FIG. 3 shows relative rotation of the driving and driven members. The driving member drives the spring seat 15 and the springs 19 and 20 are shown compressed in the maximum torque transmitting position in which the abutments 17 and 18 are engaging. The driven plate is shown shifted relative to the driving plate for maximum torque transmission. Normally, however, the torque transmission is transmitted for damping torsional vibrations in a position between the positions shown in FIG. 2 and FIG. 3. The torque is transmitted through the springs and the torsional vibrations are damped.

The embodiments of the invention in which an exclusive property or privilege is claimed are defined as follows:

1. A torque transmitting vibration damper comprising, a driving member and a driven member defining angularly spaced spring slots, spring assemblies including at least one spring in each of said slots, a spring seat on each end of said springs for transmitting torque from said driving member to said driven member through said spring assemblies, each of said spring seats having means extending axially within said springs to form abutments limiting the maximum compressive force transmitted through said springs.

2. A torque transmitting vibration damper as set forth in claim 1 including, means defining recesses for aligning spring assemblies in said driving member.

3. A torque transmitting vibration damper as set forth in claim 1 including, means defining recesses in said spring seats for engaging tapered protrusions on said driving member for radial alignment of said spring assemblies in said driving and driven member.

4. A torque transmitting vibration damper as set forth in claim 1 including, means defining a primary recess in the ends of said spring seats for engaging and aligning the spring seat, centering means in said primary recess for centering the protrusion in said driving spring seat in said primary recess.

5. A torque transmitting vibration damper as set forth in claim 1 including, means defining primary and secondary recess means in the end of said spring seats, said primary recess means adapted for centering protrusions on said driving member, said secondary recess means adapted for aligning protrusions on the driven member relative to said driving member.

6. A torque transmitting vibration damper as set forth in claim 1 including means, defining a tapered recess means in the end of said spring seats, means defining a tapered protrusion on said driving member to radially align said spring seats on said driving member.

7. A torque transmitting vibration damper as set forth in claim 1 wherein said abutments of spring seats define a cylindrical protrusion extending axially within said spring for a limited axial dimension, said abutments defining limit stops for limiting the compression of said springs to avoid excessive strain on the springs.

8. A torque transmitting vibration damper as set forth in claim 1 wherein said spring means includes two springs.

9. A torque transmitting vibration damper as set forth in claim 1 wherein said spring seat defines two facings in axial spaced relation relative to each other to provide spring supporting structure axially offset from each other, said spring means includes two springs engaging said facings.

10. A torque transmitting vibration damper as set forth in claim 1 wherein said spring seats on either end of said springs are interchangeable.

* * * * *